C. M. BOLL.
LOG BUOY.
APPLICATION FILED MAY 16, 1908.

919,531.  Patented Apr. 27, 1909.

WITNESSES:
O. R. Erwin
L. D. Bremer

INVENTOR
Carl M. Boll
By Erwin & Wheeler
ATTORNEYS.

UNITED STATES PATENT OFFICE.

CARL M. BOLL, OF MERRILL, WISCONSIN.

LOG-BUOY.

No. 919,531.     Specification of Letters Patent.     Patented April 27, 1909.

Application filed May 16, 1908. Serial No. 433,256.

*To all whom it may concern:*

Be it known that I, CARL M. BOLL, a citizen of the United States, residing at Merrill, county of Lincoln, and State of Wisconsin, have invented new and useful Improvements in Log-Buoys, of which the following is a specification.

My invention relates to improvements in log-buoys or floats.

The object of my invention is to provide a simple and efficient float or buoy, which is adapted to be quickly and easily attached to heavy logs or timber, the specific gravity of which is such that they will not otherwise float in water.

My invention pertains more specially to the mechanism by which a float may be quickly and easily attached to the upper surface of a log at a slight distance from its respective ends, whereby the liability of the same being broken or detached by contact with other logs or stationary objects is avoided and whereby when the log has been transported to a mill or market, the buoy may be quickly removed therefrom and again and repeatedly used for like purposes.

My invention is further explained by reference to the accompanying drawings in which, Figure 1 represents a side view of my device in connection with a submerged log. Fig. 2 represents an end view of the device, shown in Fig. 1. Fig. 3 is an enlarged detail drawing of the fastening dog removed from the log, showing lug 10 curved upwardly instead of downwardly. Fig. 4 represents a modified form of fastening device, in which the dog is connected with the float through a slidable instead of a pivotal connection, and Fig. 5 represents the dog inserted through an aperture of a rigidly connected bar.

1 represents a log submerged in water, 2 represents the buoy by which the log is caused to float in the water, the buoy 2 being preferably provided at its respective ends with fastening lugs 3, which are secured thereto by bolts or rivets 4, in any convenient manner.

5 is a fastening dog, which is pivotally connected with the lugs 3 by the pivotal bolt 6. The dog 5 is provided with a fastening barb. 7, which is adapted to be driven into the surface of the log, whereby the float is securely held in place. The dog also comprises an impact head 8, which is adapted to receive the strokes of a mallet or hammer when driving the barb 7 into the surface of the log. The dog 5 is also preferably provided with an elongated slot 9 for the reception of the pivotal bolt 6, which permits of the required movement between the pivotally connected parts which is produced as the barb is being driven into the log. The dog is also preferably provided with a rearwardly projecting lug 10, which facilitates in disengaging the barb from the log and between which and the log a crow bar may be inserted for such purposes. The float 2 is preferably made of sheet metal but may be made of wood or other substances of less specific gravity than water.

In the modified form, shown in Fig. 4, the float 2 is provided at its respective ends with an elongated loop 12, while the dog 5 is provided with a lateral projection 13 through which an aperture 14 is formed, for the reception of said loop 12, whereby when the barb 7 is driven into the log, said lateral projection 13 is free to slide down upon said loop until the barb has penetrated the required distance into the log. It will be understood that in other respects, the modified form is adapted to perform the same functions as the dog shown in the other figures.

In the modified form shown in Fig. 5, a horizontal bar 15 is connected with the floating dog 18. The dog 18 is provided with an aperture 17 for the reception of a fastening dog 18. The dog 18 is provided with laterally projecting lugs 19 and is connected with the float by a chain 20.

Having thus described my invention what I claim as new and desire to secure by Letters Patent is,

1. The combination of an elongated float adapted to be secured at its respective ends to the sides of a log, fastening dogs movably connected with the respective ends of said float, respectively provided with a barb and a contact head against which the strokes of a hammer may be applied for forcing said barb into the log.

2. The combination of a cylindrical float, a fastening dog movably connected with the respective ends of said float, provided with a barb, a head against which the strokes of a hammer may be applied for forcing the barb into the log and a projecting lug for disengaging the fastening dog from the log.

3. The combination of a float, a pair of fastening dogs, adapted to be forced into a log and means for pivotally connecting said float and dogs together.

4. The combination of a hollow cylindrical float, fastening dogs respectively comprising a contact head, a barb adapted to penetrate a log, a laterally projecting lug for disengaging said dog from a log and means for movably connecting said dogs with the respective ends of said float.

In testimony whereof I affix my signature in the presence of two witnesses.

CARL M. BOLL.

Witnesses:
WILL GEHRKE,
WILL RADATZ.